(12) United States Patent
Ross, Jr. et al.

(10) Patent No.: US 6,170,328 B1
(45) Date of Patent: Jan. 9, 2001

(54) LEVER GAUGE WITH HINGED ARMS

(75) Inventors: Herbert G. Ross, Jr., Argyle; Agoston Horvath, Plano, both of TX (US)

(73) Assignee: Rochester Gauges, Inc., Dallas, TX (US)

( * ) Notice: Under 35 U.S.C. 154(b), the term of this patent shall be extended for 0 days.

(21) Appl. No.: 09/369,126

(22) Filed: Aug. 5, 1999

(51) Int. Cl.[7] .................. G01F 23/32; G01F 23/30; G01F 23/00
(52) U.S. Cl. .................. 73/305; 73/305; 73/319; 73/322.5; 73/309
(58) Field of Search .................. 73/317, 305–306, 73/309, 313–315, 318–322.5, DIG. 5; 116/229

(56) References Cited

U.S. PATENT DOCUMENTS

| | | | |
|---|---|---|---|
| 1,634,165 | 6/1927 | Williams . | |
| 2,551,792 | 5/1951 | de Glers et al. | 73/317 |
| 4,641,122 | 2/1987 | Hennequin | 338/33 |
| 4,667,711 | * 5/1987 | Draft | 141/198 |
| 5,085,078 | 2/1992 | Baux et al. | 73/313 |
| 5,272,918 | * 12/1993 | Gaston et al. | 73/290 R |

* cited by examiner

Primary Examiner—Hezron Williams
Assistant Examiner—Dennis Loo
(74) Attorney, Agent, or Firm—Sidley & Austin (57) ABSTRACT

Liquid level lever gauge with a hinged counterweight segment, or a hinged float arm segment or both a hinged float arm segment and a hinged counterweight segment. The invention permits lever arm gauges to be used in liquid storage tanks having small openings through which the gauge can be inserted.

35 Claims, 4 Drawing Sheets

LEVER GAUGE WITH HINGED ARMS

TECHNICAL FIELD OF THE INVENTION

This invention relates to liquid level gauges of the lever type having a float arm which pivots to allow a float to remain at the surface of a liquid. In one aspect, it relates to a lever gauge with a float arm and/or counter-balance arm which are/is hinged.

BACKGROUND OF THE INVENTION

Liquid level lever gauges of the type which have a buoyant float mounted on a pivoting arm for measurement of liquid level are well known. Such lever gauges have a float mounted on a lever arm connected to a rotating shaft. Variations of liquid level cause the float and lever to move thereby imparting rotation to the shaft. This angular movement of the float is used to provide a mechanical or electrical external indication of the liquid level in the tank.

The lever gauges of the present invention have the advantage that they can be inserted into a opening in a vessel and then attached to the vessel wall. In the past it was not possible to insert lever gauges having a counterweight opposite the float into the opening in a tank because the gauge could not be inserted through the small opening in the tank. The present invention provides a construction which allows the employment of a lever gauge having a counterweight by hinging either the counterweight, the float arm or both. This has the advantage of providing a float gauge which does not require the gear mechanism of the typical pivot float gauge, thereby, simplifying construction and minimizing cost.

SUMMARY OF THE INVENTION

Liquid lever gauges of the type having a buoyant float and a counterweight rigidly mounted on a rotatable axial member are provided. In one aspect of the present invention, a liquid lever gauge is provided comprising a gauge head, a support member, a float structure which includes an axial member, a float arm segment rigidly attached to the axial member and a counterweight segment rigidly attached to the axial member. The gauge head is adapted for mounting to a portion of a liquid storing container. The support member is rigidly connected to the gauge head and depends therefrom. The float arm structure includes an axial member rotatably held by the gauge head and the support member. The float arm structure has a float arm segment and a counterweight segment which are rigidly attached to the axial member and extending substantially perpendicular from the axial member. In one embodiment of the present invention the counterweight segment contains a hinge to permit deflection of the counterweight section. In a second embodiment of the present invention, the float arm segment contains a hinge to permit deflection of the float arm segment. In yet another embodiment of the present invention both the counterweight segment and the float arm segment each contain a hinge to permit deflection of those sections. The hinge section(s) is/are biased so that they are in a first configuration in which the lever gauge is utilized to provide an indication of the liquid level in a storage container. The hinge section(s) is/are biased to hold the segments in the first configuration. The hinged segments may be deflected to permit insertion of the gauge through a small mounting opening in a storage tank.

In one aspect, the present invention has a hinged counterweight section. In this embodiment the gauge head rotatably supports the axial member which depends therefrom. Rigidly connected to the axial member is a counterweight segment which includes an elongate inner arm section having a hinge attached to its end opposite to the end attached to the axial member. The other end of the spring is connected to the elongate outer arm section and the counterweight is attached to the elongate outer arm section opposite the spring connection. A float arm segment is rigidly attached to the axial member in a direction opposite the counterweight segment. The float arm segment is the float arm section with a float attached distant from the connection of the float arm section and the axial member.

In another embodiment, the invention has a hinged float arm segment. In this embodiment the gauge head has an axial member rotatably depending therefrom. Rigidly attached to the axial member is a counterweight section having a counterweight attached thereto at a location distant from the axial member. Rigidly attached is the axial member and extending in a direction opposite the counterweight is a float arm segment. The float arm segment of this embodiment has an elongate float arm section rigidly attached to said axial member. A spring is attached to the end of the inner float arm section distant from the axial member. Attached to the other end of the spring is an elongate outer float arm section with a float attached to its end opposite the end attached to the spring.

In the third embodiment of the invention both the float arm segment and the counterweight segment are hinged.

BRIEF DESCRIPTION OF THE DRAWINGS

A more complete understanding of the invention and its advantages will be apparent from the following detailed description when taken in conjunction with the accompanying drawings, in which.

DETAILED DESCRIPTION OF THE INVENTION

Figure 1:
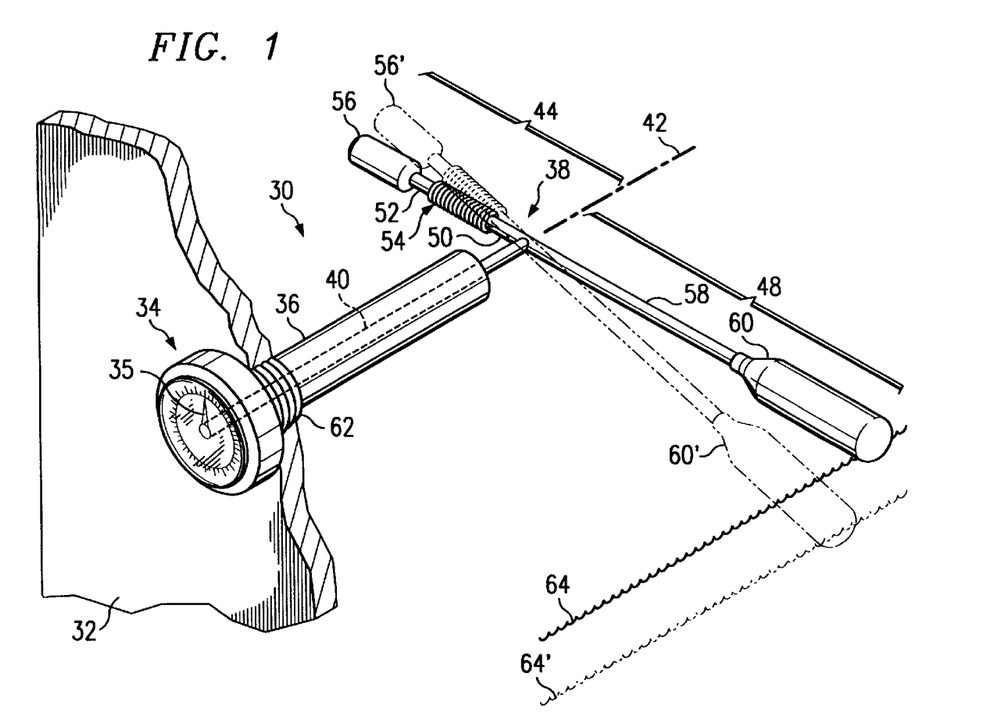
FIG. 1 is an isometric view in partial cross section of a storage tank having a liquid level lever gauge according to one embodiment of the invention installed therein.

Referring now to the drawings wherein like reference characters designate like or corresponding parts throughout several views, several embodiments of the liquid level lever gauge of the present invention are illustrated. Referring first to FIG. 1, liquid level lever gauge 30 is shown installed in a storage container (tank) 32 which is a liquid storing container of the type used for storing pressurized liquids such as LPG. The gauge 30 includes a gauge head 34 which has extending therefrom a support member 36 which is attached to gauge head 34. Support member 36 together with gauge head 34 hold the float arm structure generally indicated as 38. Float arm structure has an axial member 40 which defines an axis 42 which is rotatably mounted to said gauge head 34 and support member 36. Float arm structure 38 also includes a counterweight segment 44 and a float arm segment 48. Float arm segment 48 extends from the axial member 40 in a direction substantially perpendicular to the axis 42. Likewise, counterweight segment 44 extends from the axial member 40 in the direction substantially perpendicular to axis 42. Float arm segment 48 and counterweight segment 44 may be coaxial to one another but are not required to be coaxial. For ease of illustration all embodiments will show the two sections as coaxial.

Counterweight segment 44 includes an elongate inner arm 50, an elongate outer arm 52, a hinge 54, and can include a counterweight 56. Float arm segment 48 includes a float arm section 58 and attached to the outer end thereof is a float 60. The gauge head 34 is adapted for mounting to a portion of the tank 32. In the embodiment illustrated in FIG. 1 threads 62 hold gauge head 34 which is rigidly connected to support member 36 and extends from the gauge into the interior of the tank 32.

The float 60 is buoyant so that it will float on or near the surface of the liquid 64 whose level is to be measured. A counterweight 56 can be provided as is known in the art on elongate outer arm 52. It extends in a direction opposite that of float 60. Float 60 moves in response to changing levels of the liquid 64, within the tank causing the attached float arm section 58 to pivot within its plane of motion. An example of a change in liquid level is illustrated in phantom, 60', 64' and the gauge is provided with the mechanism 35 which detects the angular position of float arm section 58 with respect to the gauge head. This can be used to produce an indication of the liquid level corresponding to the angular position.

Float arm section 58 and elongate inner arm 50 are rigidly affixed to axial member 40. To maintain the calibration of the gauge and its measurement precision, the counterweight 56 must be in a predetermined position with respect to inner arm section 50.

Thus, as the counterweight moves from its highest to lowest position, as well as throughout the range of motion, the counterweight 56 on the outer arm section 52 must remain in a first configuration, i.e., with the outer arm section in the same position relative to the inner arm section 50, to preserve calibration and accuracy of the gauge.

Previously, liquid level lever gauges had a rod with a float on one end and a counterweight on the other end and the rotating member was rigidly attached to the rod intermediate the counterweight and float. This configuration did not permit the lever gauge to be inserted through a small opening in a tank. The present invention allows the lever gauge to be constructed such that it may be inserted through a small hole, such as a threaded hole to receive a gauge head. This may be done in several different manners as described herein.

Figures 2, 5:
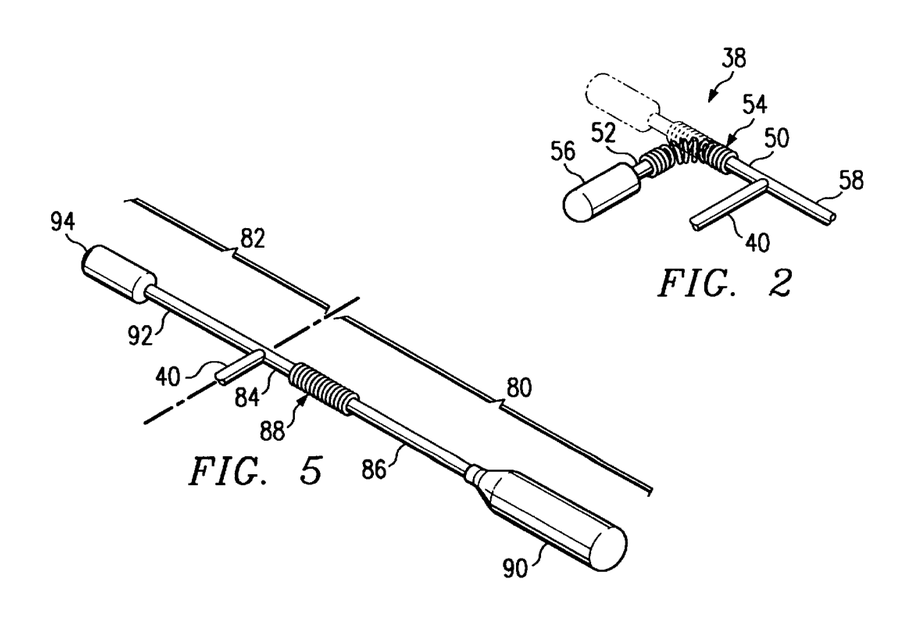
FIG. 2 is a partial isometric of one embodiment of the present invention.
FIG. 5 is a partial isometric view of another embodiment of the present invention.

FIG. 2 is a partial view of the lever gauge showing axial member 40 and attached thereto a portion of float arm section 58 and elongate inner arm 50. FIG. 2 shows counterweight 56 attached to the outer end of the elongate outer arm 52 and hinge 54 deflected from its normal position. The hinge section 54 is deflectable to allow movement of the outer arm 52 between a first configuration in which the elongate outer arm is in a predetermined position with respect to the elongate inner arm 50 which is shown in phantom and a second configuration in which the elongate outer arm section is not in the predetermined position with respect to the elongate inner arm section. The hinge section 54 also provides a biasing force for urging the elongate outer arm into the first configuration. In the first configuration the elongate outer arm 52 and elongate inner arm 50 are axially aligned with each other. It will be appreciated that for any embodiment of the current invention, the first configuration will be a single specified predetermined position of the elongate outer arm 52 relative to elongate inner arm 50, while the second configuration can constitute a range of positions for the elongate outer arm 52 with respect to the elongate inner arm 50. It is not necessary that the arm sections of the current invention be straight as illustrated. Although not shown the arms can comprise curved or angled members provided that the sections can move from the same predetermined fixed first configuration into another, different configuration when the hinge is deflected.

Figure 3:
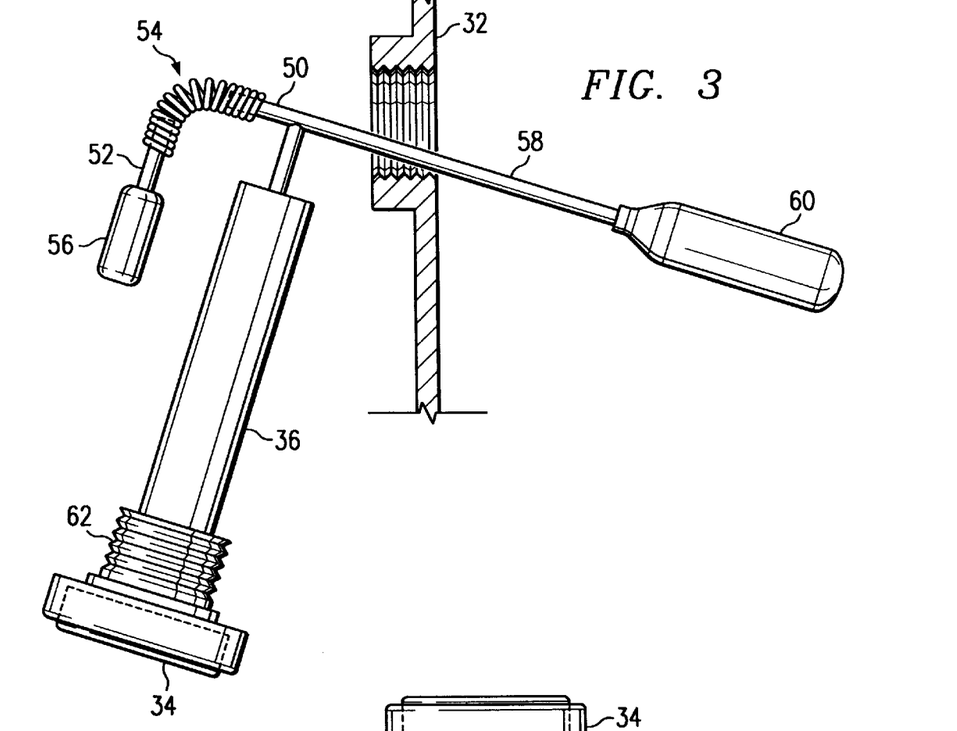
FIG. 3 is a partial cross section of a tank and illustrates a gauge of the present invention being inserted therein.

FIG. 3 illustrates how the hinge allows the counterweight 56 to be deflected so that it can pass through the threaded opening 66 of the tank 32.

Figure 4:
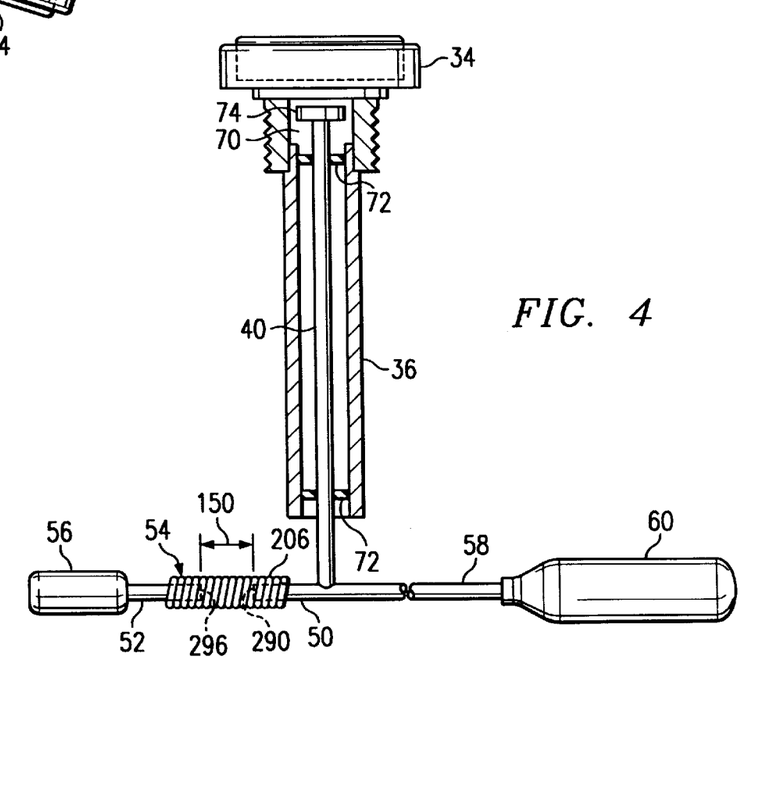
FIG. 4 is a partial cross section of a lever gauge of the present invention.

FIG. 4 shows a partial cross section of one embodiment of the invention. As illustrated head 34 defines an opening 70 which receives support member 36. Support member 36 may be connected in any suitable manner. It has been found convenient to utilize a press fit. Axial member 40 is rotatably supported or mounted on support member 36 by bushings 72. At the end of axial member 40 opposite the end to which the float and counterweight are attached is a magnet 74. As the float moves through its arc, shaft 40 rotates thereby rotating magnet 74. Head 34 is made from a nonmagnetic material and on the portion which is outside the tank it has a pointer assembly which includes a magnet and attached to the head 34 opposite the magnet 74 on the axial member 40. As magnet 74 rotates it will cause the magnet of the pointer assembly to rotate thereby moving the pointer. Such magnetic coupling and magnetic pointer assemblies are well known to those skilled in the art. Other methods and devices are also known in the art to provide an indication of the float position and they may also be used.

FIG. 5 shows an alternate embodiment. For simplicity of illustration this is a partial view of the invention. Axial shaft 40 has attached to it a float arm segment 80 and a counterweight segment 82. Float arm segment 80 and counterweight segment 82 both extend substantially perpendicular from axial member 40. As described above they may be coaxial with one another or offset. Float arm segment 80 has an elongate inner float arm section 84 which is rigidly attached to axial member 40. Float arm segment 80 also includes elongate outer float arm section 86, hinge 88 connecting the inner float arm section 84 with the outer float arm section 86. A float 90 is attached to the end of elongate outer float arm section 86 at the end opposite the end of the hinge where the hinge 88 is attached. The counterweight segment 82 has an elongate counterweight section 92 which is rigidly attached to axial member 40. Counterweight segment 82 can also include a counterweight 94 attached to the end of elongate counterweight section 92. It will be appreciated that the counterweight 94 does not need to be a separate component. Proper sizing and weight of elongate counterweight section 92 can be such that the counterweight 94 is not an identifiable separate portion.

The embodiment shown in FIG. 5 operates in a manner similar to that described for FIGS. 1, 2 and 3 except that in this embodiment the float arm segment 80 is deflectable and the counterweight segment 82 is not. As described above for the flexible counterweight segment 44, it is important that the hinge 88 of the deflectable float arm segment 80 be biased such that it will hold a first configuration. The hinge section 88 is deflectable so as to allow movement of the outer float arm section 86 between a first configuration which the outer float arm section 86 is in a predetermined position with respect to the inner float arm section 84, and a second configuration of which the outer float arm section 86 is not in the predetermined position with respect to the inner float arm section 84. The hinge 88 also provides a biasing force to urge the sections 84, 86 into the first configuration. The first configuration as shown in FIG. 5 is where the elongate inner float arm section 84 and the outer elongate float arm section 86 are longitudinally aligned. The second position is any in which the hinge 88 is deflected. In use, the hinge 88 can be deflected so as to permit the gauge to be installed through a small threaded opening in a tank in a manner similar to that illustrated in FIG. 3.

Figure 6:
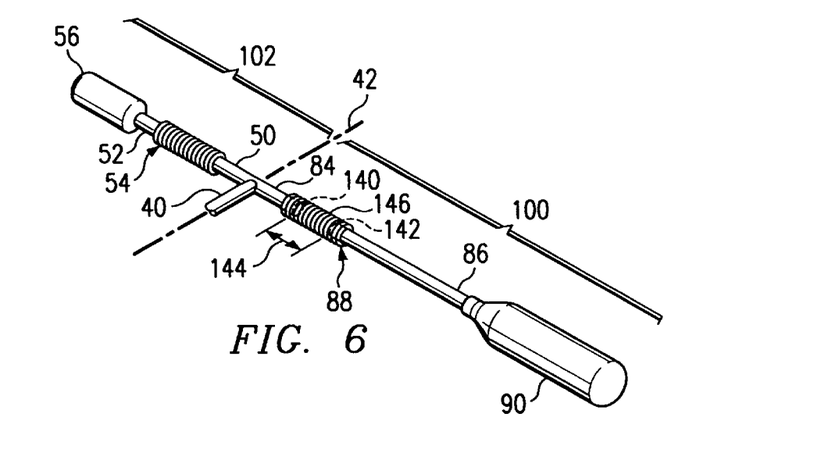
FIG. 6 is a partial isometric view of yet another embodiment of the present invention.

FIG. 6 shows yet another embodiment of the present invention. FIG. 6 is a partial view showing axial shaft 40, a float arm segment 100, and a counterweight segment 102. This embodiment represents a combination of the embodiments shown in FIG. 1 and in FIG. 5. In this embodiment both the float arm segment 100 and the counterweight segment 102 are deflectable. It is expected that in most applications this embodiment will not be needed as embodiments shown in FIG. 1 or 5 can be inserted through a small opening. However, there may be some situations in which having both segments 100,102 deflectable will be beneficial.

Figures 7A, 7B:
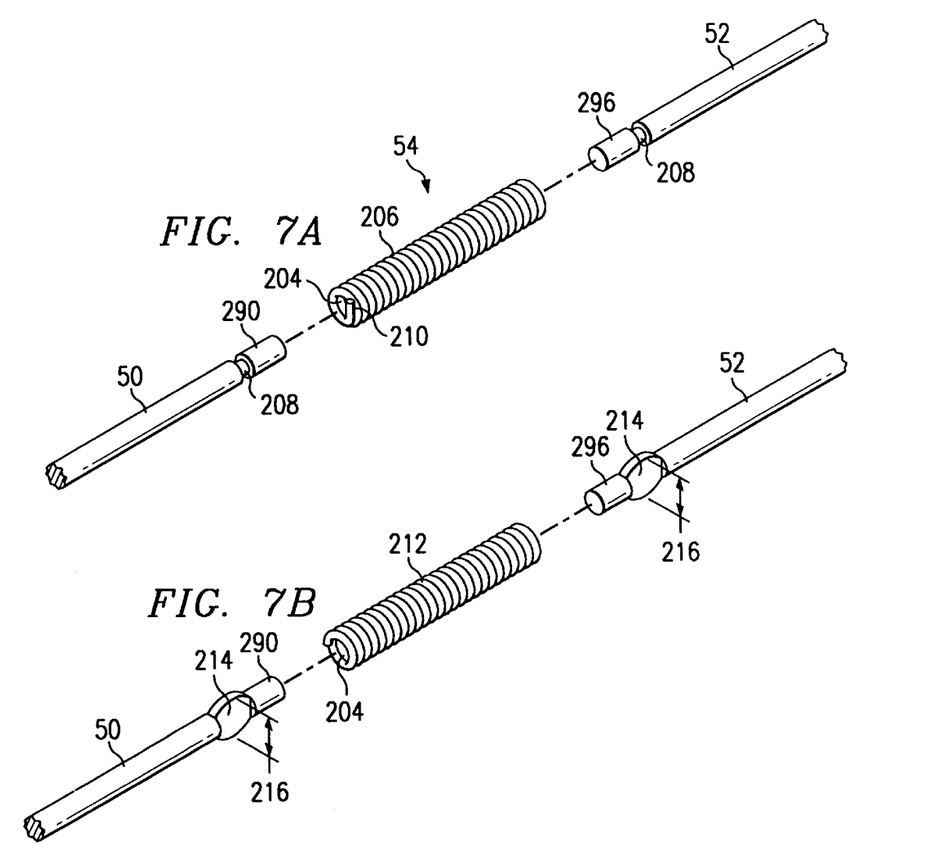
FIG. 7A is an isometric view of a portion of another embodiment of the invention, showing details of the hinge section with the components exploded away from one another.
FIG. 7B is an isometric view of a portion of another embodiment of the current invention, showing details of the hinge section with the components exploded away from one another.

In the embodiment shown in FIG. 1, the hinge section 54 can be formed as illustrated in FIGS. 7A and 7B. The hinge section 54 comprises a close wound cylindrical helical extension spring 206 having a cylindrical bore 204 and an initial tension. The term "close wound" indicates that the coils of the spring 210 are touching one another when the spring is in an unflexed condition. The term "initial tension" is used to define a force or a load, typically measured in pounds or ounces, which presses the coils of a close wound extension spring against one another. This force must be overcome before the coils of a spring begin to open up. It is known in the art that initial tension can be wound into extension springs by bending each coil as it is wound away from its normal plane, thereby producing a slight twist in the wire which causes the coil to spring back tightly against the adjacent coil. The proximate ends 290, 296 of the arm sections 50, 52, respectively, are positioned within the bore 204 (shown in FIGS. 7A, 7B) of the spring 206 with a gap 150 left in-between to allow for the coils of the spring to flex when the outer arm section is moved from the first configuration. A gap 150 having a length between ends 290, 296 within the range from about 1 inch to about 2 inches has been shown to provide satisfactory deflection, although other gap lengths are within the scope of the current invention. It will be readily apparent how the initial tension of spring 206 will produce a continuous biasing force which urges the elongate outer arm section 52 into the predetermined position with respect to elongate inner arm section 50 constituting the first configuration of the current invention. The spring 206 in the counterweight section can have an initial tension of from about 1 to 7 pounds. It will be appreciated that the discussion of hinge for counterweight segments applies to the float arm segment and vice versa. However, because the counterweight segment is usually shorter than the float arm segment, and the counterweight has less force applied to it by the liquid than the float, the hinge of the counterweight segment need not require as much biasing force to remain in the first configuration when in use as does a hinge in the float arm segment. The overall length of the counterweight segment is typically less than the length of the float arm segment. The length of the inner arm section, outer arm section, and the size and weight of the float are selected considering the float segment characteristics and the specific gravity of the liquid to be measured as is known in the art. A gap of about ½ inch or more between the inner and outer arm sections has been found sufficient to permit deflection of the outer arm section from the inner arm section.

In embodiments of the current invention as shown in FIGS. 5 and 6, the float arm segment 80, 100 can have any overall length (from axial member 40 to float 90) which is useful for the size of the container, and typically range from as little as 6 inches to 2 feet. The materials of construction and dimensions of float 90 are determined by taking into account the specific gravity of the liquid and the characterization of the liquid as is known in the art. The inner float arm section 84 has a length sufficient to attach the hinge, about 2 inches has been found useful. The outer float arm section 86 is of a desired length and the proximate ends 140, 142 of the arm sections are separated by a gap 144 having a length sufficient to permit flexing of hinge and a gap of about ½ inch or more has been found useful. The hinge section 88 of this embodiment comprises a close wound cylindrical extension spring 146 having an initial tension within the range from about 5 pounds to about 7 pounds. The gauge of this embodiment is suitable for use in a horizontal LPG tank. It will be readily appreciated, however, that different values for arm section lengths, initial tension and gap length can be used without departing from the scope of the current invention. The parameter values needed for other gauge/tank combinations can be readily determined by evaluating the geometry of the installation and weight of the components involved.

Referring still to FIG. 6 in the embodiment shown, the inner and outer float arm sections 84, 86 are formed from aluminum rod stock which provides the benefits of light weight and corrosion resistance. In this embodiment, the proximate ends 140, 142 of the arm sections 84, 86 are connected to the opposite ends of the spring 146 by using a punch or similar device to crimp the spring ends (which are typically made of steel) down into the material of the arm sections.

It will be readily apparent, however, that other methods of attachment can be used. For example, referring now to FIG. 7A, another embodiment of the current invention is shown in which the hinge section 54 also comprises a close wound cylindrical helical extension spring, denoted by reference number 206. A first circular groove 208 is formed on the outer arm section 52 near its inner end 296 and a second circular groove 208 is formed on the inner arm section 50 near its outer end 290. Wire segments 210 are formed on each end of the spring 206, each wire segment being bent inwardly into a region constituting a longitudinal extension of the cylindrical bore 204 of the spring. By temporarily flexing the wire segments 210 radially outwards, the inner and outer ends 290, 296, respectively, of the outer and inner arm sections 50, 52 can be inserted into the bore 204 until the wire segments 210 snap into position within the circular grooves 208, thereby securing the arm sections 50, 52 to the spring 54. This attachment method can be used where the material for the counterweight arm section 50, 52 is not suitable for the crimping method previously discussed, or where other considerations preclude the crimping of the spring directly onto the arm section ends.

Referring now to FIG. 7B, yet another embodiment of the current invention is shown wherein the hinge section 54 comprises a close wound cylindrical helical extension spring, denoted in this case by reference numeral 212. A first upset region 214 is formed near the inner end 296 of the outer arm section 50 and a second upset region 214 is formed near the outer end 290 of the inner float arm section 50. These upset regions 214 are formed on the arm sections by crimping or other methods known in the art. Each of the upset regions 214 has a maximum lateral dimension, denoted by reference number 216, which exceeds the diameter of the spring bore 204 when the spring 212 is in an unflexed condition. For attachment to the arm sections 50, 52 the ends of the spring 212 are forced over the ends 290, 296 of the float arm sections and the upset regions 214. The upset regions will radially flex the adjacent coils of the spring 212 and producing a bias force between the spring 212 and the upset regions 214 which secures the arm sections 50, 52 to the hinge section 54. In still other embodiments (not shown) of the current invention utilizing a coil spring in the hinge section 50, the spring can be connected to the ends 290, 296 of the arm sections 50, 52 by spot welding, brazing, soldering, adhesives or other attachment technology known in the art.

Figures 8A, 8B, 9, 10A, 10B:
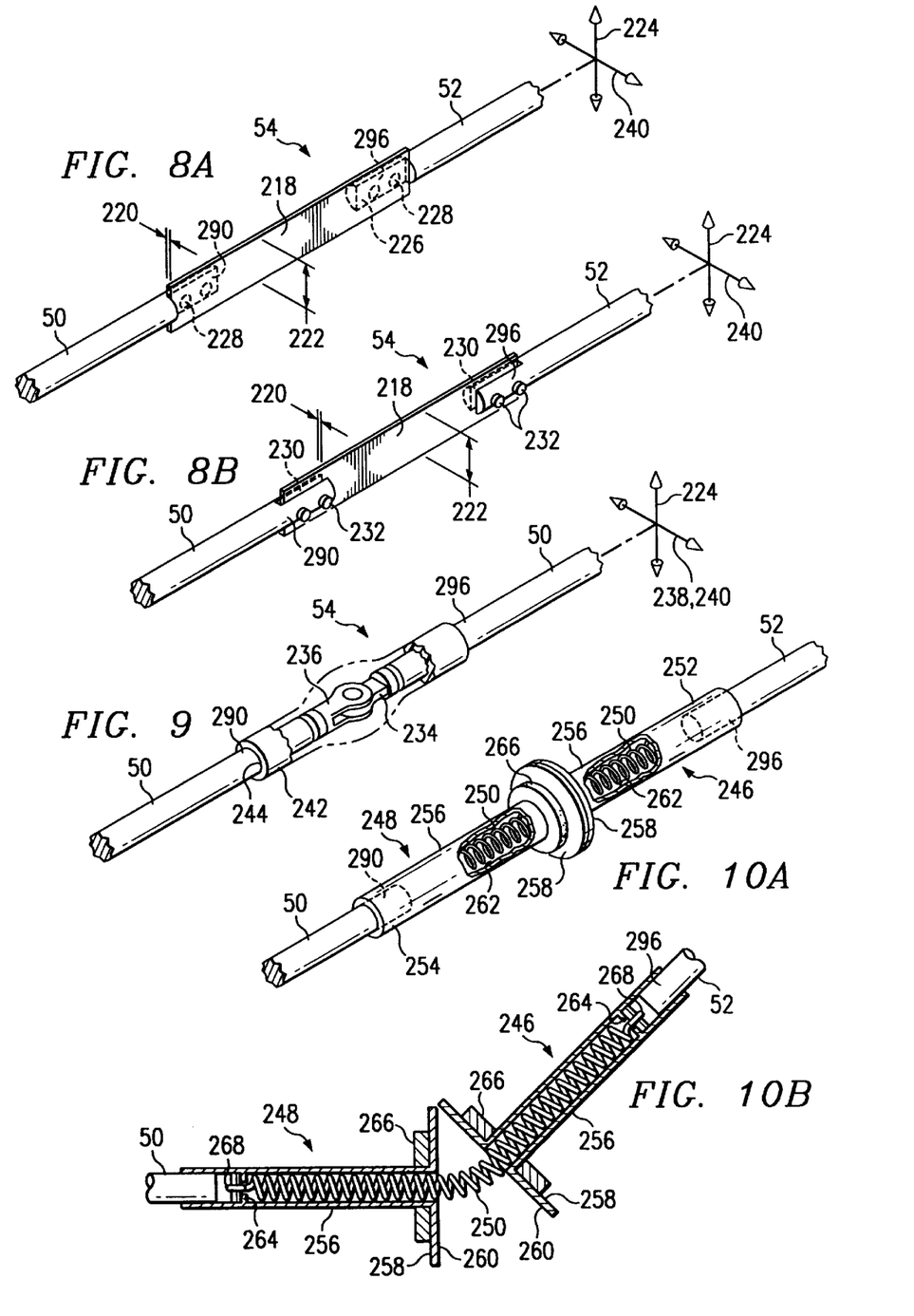
FIG. 8A is an isometric view of a portion of yet another embodiment of the current invention, showing the details of the end section.
FIG. 8B is a perspective view of a portion of a further embodiment of the current invention, showing details of the hinge section.
FIG. 9 is an isometric view of a portion of still another embodiment of the current invention, showing details of the hinge section.
FIG. 10A is an isometric view of the portion of the float arm for another embodiment of the current invention, with portions broken away showing details of the hinge section when in the undeflected position.
FIG. 10B is a cross sectional view of FIG. 10A, showing the hinge section when in the deflected position.

Referring to FIGS. 8A and 8B, in yet further embodiments of the current invention, the hinge section 54 comprises a flat leaf spring 218. The spring 218 can be formed of spring steel, copper- or nickel-based spring alloy, glass- or carbon-reinforced epoxy composite material, or other spring materials known in the art. The spring 218 has a rectangular cross-section with a thickness 220 and a width 222, the thickness being substantially smaller than the width. For example, in one embodiment the spring 218 is made from spring steel material having a thickness 220 within the range of about 0.01 inches to about 0.02 inches and a width 222 within the range of about 0.10 inches to about 0.30 inches. The spring 218 is connected to the inner arm section 52 such that during use, the width 222 is oriented in a substantially vertical direction, as denoted by reference numeral 224. The differential between the magnitudes for thickness 220 and width 222 of the spring 218 will result in the spring 218 being relatively flexible in the horizontal direction 240 (i.e., perpendicular to the width 222) and relatively stiff in the vertical direction 224 (i.e., perpendicular to the thickness 220). The flexibility of the hinge section 54 in the horizontal direction 240 will allow the outer arm section 52 to deflect in the horizontal direction from its original position with respect to inner arm section 50 and allow the lever gauge to be inserted into the container tank, and the bias force produced by the deflected spring 218 will urge the outer arm section 52 back toward its original position. The stiffness of the hinge section 54 in the vertical direction 224 will ensure that no significant deflection occurs in the vertical position of the outer arm section 52 with respect to the inner arm section 50 such that the calibration and accuracy of the gauge is maintained.

Referring still to FIGS. 8A and 8B, the spring 54 can be connected to the float arm sections 50, 52 by any method known in the art. For example as shown in FIG. 8A, flat surfaces 226 can be formed on the ends 290, 296 of the arm sections and the spring 218 can be attached to these flat surfaces by means of welding, adhesives or other methods known in the art. In the embodiment shown in FIG. 8A, spot welds 228 are used. Referring now specifically to FIG. 8B, in still another alternative embodiment, a slot 230 can be formed in the end 290, 296 of the arm sections and the flat leaf spring 218 can be affixed in the slots using pins 232. While the preferred embodiments utilize flat surfaces 290 or slots 230 for connection of the spring 218 to the arm sections 50, 52, it will be readily appreciated that in other embodiments the spring could be connected directly to the otherwise unprepared arm section ends 290, 296 by welding, adhesives, or other mechanical means without departing from the scope of the current invention.

Referring now to FIG. 9, in still another alternative embodiment of the current invention, the hinge section 54 comprises a first hinge member 234 and a second hinge member 236 pivotally connected to one another to allow relative movement along a line of motion 238. The first hinge member 234 is connected to the inner end 296 of the outer arm section 52 and the second hinge member 236 is connected to the outer end 290 of the inner arm section 50. The hinge members 234, 236 are connected to the inner arm section 50 such that during use, the plane of motion 238 is oriented in a substantially horizontal direction, as denoted by line 240. To provide the required biasing force, the hinge section 54 of this embodiment further comprises an elastic member connected between the arm sections 50, 52 for urging the outer arm section 52 into the first configuration, i.e., into the predetermined position with respect to inner arm section 50. In the embodiment shown in FIG. 9, the elastic member comprises an elastomer sleeve 242 having a bore 244. The elastomer sleeve 242 is connected to the arm sections 50, 52 with the hinge members 234, 236 being positioned within the bore 244. It will be readily apparent that other structures can be used to provide the elastic member of this embodiment, for example, a cylindrical helical spring (not shown) could be used in place of the elastomer sleeve previously discussed. In yet another embodiment, a flat leaf spring connected between arm sections 50, 52 and running above, below or to one side of the hinge members 234, 236 could be used.

Referring now to FIGS. 10A and 10B, another embodiment of the current invention is shown, wherein hinge section 54 comprises first and second guide members 246, 248 respectively, and an elastic member 250 connected therebetween. The first guide member 246 is connected at a first end 252 to the inner end 296 of the outer arm section 52. The second guide member 248 is connected at a first end 254 to the outer end 290 of the inner arm section 50. Each guide member 246, 248 includes a longitudinally oriented body portion 256 and a terminal portion 258. The terminal portion 258 is disposed at a second end of each guide member 246, 248 and defines a mating surface 260 facing away from the body portion 256 and generally perpendicular to the longitudinal direction. Each guide member 246, 248 defines a passage 262 formed through the mating surface 260 and extending into the body portion 256 to an anchor point 264. The elastic member 250 has a first end 268 secured at the anchor point 264 of the first guide member 246 and extends through the passages 262 in the first and second guide members, and has a second end 268 secured at the anchor point 264 of the second guide member 248. The elastic member 250 provides a biasing force for urging the mating surfaces 260 together in a juxtaposed arrangement. In the embodiment shown in FIGS. 10A and 10B, the elastic member 250 is a cylindrical helical extension spring held in tension when the mating surfaces 260 are juxtaposed. To further increase the biasing force urging the arm sections 50, 52 into the first configuration, one or more magnets 266 can be positioned adjacent to the terminal portions 258 of the guide members 246, 248 so as to produce a magnetic force attracting the mating surfaces 260 together when juxtaposed. If the guide members 246, 248 are made of ferrous metal or other magnetic materials, a single magnet 266 can provide the attractive force. If nonmagnetic materials such as aluminum or plastic are utilized for the guide members 246, 248, then at least two magnets 266 can be used, one magnet being positioned on each guide member as shown in FIG. 10B with their polarities arranged so as to provide an attractive force when the mating surfaces 260 are juxtaposed. FIGS. 7A–10B are the same as in copending application Ser. No. 09/141,504.

In operation, a gauge according to the current invention can be installed into a tank that previous lever gauges could not be installed because in the current invention either the float segment or counterweight segment can be deflected from the first configuration such that the lever gauge can pass through a small opening. After the gauge is inserted through the opening, the biasing force provided by the hinge section will cause the gauge deflectable segment to return to the first configuration such that the calibration and accuracy of the gauge will remain unchanged.

It will be noted that while some embodiments of the current invention have a hinge section which deflects in the horizontal direction only, other embodiments can deflect in other directions in addition to the horizontal direction. When additional directions of deflection are provided, they serve to protect the gauge mechanism from transient stresses and shocks which can occur during transportation of the installed gauges.

Thus, there is disclosed a liquid level gauge lever that overcomes the shortcomings and disadvantages of the prior art gauges. While the foregoing embodiments of the invention have been disclosed with reference to a specific gauge structure, it is to be understood that many changes in detail may be made as a matter of design choices, without departing from the spirit and scope of the invention, as defined by the appended claims.

What is claimed is:

1. A liquid level gauge comprising:
   (a) a gauge head adapted for mounting to a portion of a liquid storage container;
   (b) a float arm structure having an axial member, said axial member defining an axis and being rotatably mounted to said gauge head and depending therefrom;
   (c) said float arm structure including a float arm segment extending from said axial member substantially perpendicular to said axis of said axial member, and a counterweight segment extending from said axial member substantially perpendicular to said axis of said axial member and opposite the direction of extension of said float arm segment;
   (d) said counterweight segment having an elongate inner arm section, an elongate outer arm section and a hinge section;
   said inner arm section being rigidly connected to said axial member for movement through an arc defining a first plane;
   said hinge section being connected at a first end to an outer end of said inner arm section and connected at an opposite end to an inner end of said outer arm section;
   said hinge section being deflectable to allow movement of said outer arm section between a first configuration in which said outer arm section is in a predetermined position with respect to said inner arm section and a second configuration in which said outer arm section is not in said predetermined position with respect to said inner arm section;
   said hinge section providing a biasing force for urging said outer arm section into said first configuration; and
   (e) said float arm segment having an elongate float arm section rigidly attached to said axial member for movement through an arc; and
   (f) a float connected to an outer end of said elongate float arm section.

2. A gauge according to claim 1, wherein said predetermined position constitutes said outer arm section being longitudinally aligned with said inner arm section.

3. A gauge according to claim 1, wherein said hinge section comprises a close wound cylindrical helical extension spring, said spring, when in an unflexed condition, defining a cylindrical bore and having an initial tension.

4. A gauge according to claim 3, wherein said outer end of said inner arm section and said inner end of said outer arm section are separated by a distance within the range of about 1 inch to about 2 inch.

5. A gauge according to claim 3, wherein said spring has an initial tension within the range of about 2 pounds to about 7 pounds.

6. A gauge according to claim 3, further comprising:
   a circular groove formed on said outer arm section near said inner end;
   a circular groove formed on said inner arm section near said outer end;
   wire segments formed on each end of said spring;
   each said wire segment being bent inwardly into a region constituting a longitudinal extension of said cylindrical bore of said spring; and
   said inner and outer ends, respectively, of said outer and inner arm sections being positioned within said bore and said wire segments being positioned within said circular grooves so as to secure said arm sections to said hinge section.

7. A gauge according to claim 3, further comprising:
   upset regions formed near said inner end of said outer arm section and near said outer end of said inner arm section;
   each said upset region having a maximum lateral dimension which exceeds the diameter of said spring bore when said spring is in an unflexed condition;
   portions of said arm sections including said upset regions being positioned within said spring bore, said upset regions radially flexing adjacent portions of said spring and producing a bias force between said spring and said upset regions, thereby securing said arm sections to said hinge section.

8. A gauge according to claim 1, wherein said hinge section comprises first and second guide members and an elastic member connected therebetween;

said first guide member being connected at a first end to said inner end of said outer arm section;

said second guide member being connected at a first end to said outer end of said inner arm section;

each said guide member including a longitudinally oriented body portion and a terminal portion, said terminal portion being disposed at a second end of said body portion and defining a mating surface facing away from said body portion and generally perpendicular to said longitudinal direction;

each said guide member defining a passage formed through said mating surface and extending into said body portion to an anchor point;

said elastic member having a first end secured at the anchor point of said first guide member, extending through said passages in said first and second guide members, and having a second end secured at the anchor point of said second guide member;

said elastic member providing a biasing force for urging said mating surfaces into juxtaposition.

9. A gauge according to claim 8, wherein said elastic member is a cylindrical helical extension spring held in tension when said mating surfaces are juxtaposed.

10. A gauge according to claim 8, further comprising at least one magnet positioned adjacent to one of said terminal portions;

said magnet producing a magnetic force attracting said mating surfaces of said guide members together when said mating surfaces are juxtaposed.

11. A gauge according to claim 1, wherein said hinge section is only deflectable in predetermined directions, said predetermined directions not lying in said first plane.

12. A gauge according to claim 11, wherein said hinge section comprises a flat leaf spring;

said spring having a rectangular cross section with a thickness and a width, said thickness being smaller than said width, and said spring being connected to said inner arm section such that said width is oriented in a substantially vertical direction during use.

13. A gauge according to claim 12, wherein said spring includes ends which are connected to said ends of said arm sections with welds.

14. A gauge according to claim 12, wherein said spring includes ends which are connected to said ends of said arm sections with pins.

15. A gauge according to claim 11, wherein said hinge section comprises:

a first hinge member and a second hinge member pivotally connected to one another to allow relative movement in a second plane;

said first hinge member being connected to said inner end of said outer arm section;

said second hinge member being connected to said outer end of said inner arm section such that said second plane is oriented in a substantially horizontal direction during use; and an elastic member connected between said arm sections and providing a biasing force for urging said outer arm section into said first position.

16. A gauge according to claim 15, wherein said elastic member is a elastomer sleeve defining a bore; said sleeve being connected to each said arm section; said hinge members being positioned within said bore.

17. A gauge according to claim 15, wherein said elastic member is a cylindrical helical spring connected to each said arm section; said hinge members being positioned within the bore of said spring.

18. A liquid level gauge comprising:

(a) a gauge head adapted for mounting to a portion of a liquid storing container;

(b) a float arm structure having an axial member, said axial member defining an axis and being rotatably mounted to said gauge head and depending therefrom;

(c) said float arm structure including a float arm segment extending from said axial member substantially perpendicular to said axis of said axial member, and a counterweight segment extending from said axial member substantially perpendicular to said axis of said axial member and opposite the direction of extension of said float arm segment;

(d) said float arm segment having an elongate inner float arm section, an elongate outer float arm section and a float arm hinge section;

said inner float arm section being rigidly connected to said axial member for movement through an arc defining a first plane;

said float arm hinge section being connected at a first end to an outer end of said inner float arm section and connected at an opposite end to an inner end of said outer float arm section;

said float arm hinge section being deflectable to allow movement of said outer float arm section between a first configuration in which said outer float arm section is in a predetermined position with respect to said inner float arm section and a second configuration in which said outer float arm section is not in said predetermined position with respect to said inner float arm section;

said float arm hinge section providing a biasing force for urging said outer float arm section into said first configuration; and (e) said counterweight segment having an elongate counterweight section rigidly attached to said axial member.

19. A gauge according to claim 18, wherein said predetermined position constitutes said outer float arm section being longitudinally aligned with said inner float arm section.

20. A gauge according to claim 18, wherein said float arm hinge section comprises a close wound cylindrical helical extension spring, said spring, when in an unflexed condition, defining a cylindrical bore and having an initial tension.

21. A gauge according to claim 20, wherein said outer end of said inner float arm section and said inner end of said outer float arm section are separated by a distance within the range of about 1 inch to about 2 inches.

22. A gauge according to claim 20, wherein said spring has an initial tension within the range of about 5 pounds to about 7 pounds.

23. A gauge according to claim 20, further comprising:

a circular groove formed on said outer float arm section near said inner end;

a circular groove formed on said inner float arm section near said outer end;

wire segments formed on each end of said float arm spring;

each said wire segment being bent inwardly into a region constituting a longitudinal extension of said cylindrical bore of said float arm spring; and said inner and outer ends, respectively, of said outer and inner float arm sections being positioned within said bore and said wire segments being positioned within said circular grooves so as to secure said float arm sections to said float arm hinge section.

24. A gauge according to claim 20, further comprising:
upset regions formed near said inner end of said outer float arm section and near said outer end of said inner float arm section;
each said upset region having a maximum lateral dimension which exceeds the diameter of said float arm spring bore when said spring is in an unflexed condition;
portions of said float arm sections including said upset regions being positioned within said float arm spring bore, said upset regions radially flexing adjacent portions of said float arm spring and producing a bias force between said float arm spring and said upset regions, thereby securing said float arm sections to said float arm hinge section.

25. A gauge according to claim 18, wherein said float arm hinge section comprises first and second guide members and an elastic member connected therebetween;
said first guide member being connected at a first end to said inner end of said outer float arm section;
said second guide member being connected at a first end to said outer end of said inner float arm section;
each said guide member including a longitudinally oriented body portion and a terminal portion, said terminal portion being disposed at a second end of said body portion and defining a mating surface facing away from said body portion and generally perpendicular to said longitudinal direction;
each said guide member defining a passage formed through said mating surface and extending into said body portion to an anchor point;
said elastic member having a first end secured at the anchor point of said first guide member, extending through said passages in said first and second guide members, and having a second end secured at the anchor point of said second guide member;
said elastic member providing a biasing force for urging said mating surfaces into juxtaposition.

26. A gauge according to claim 25, wherein said elastic member is a cylindrical helical extension spring held in tension when said mating surfaces are juxtaposed.

27. A gauge according to claim 25, further comprising at least one magnet positioned adjacent to one of said terminal portions;
said magnet producing a magnetic force attracting said mating surfaces of said guide members together when said mating surfaces are juxtaposed.

28. A gauge according to claim 18, wherein said float arm hinge section is only deflectable in predetermined directions, said predetermined directions not lying in said first plane.

29. A gauge according to claim 28, wherein said float arm hinge section comprises a flat leaf spring;
said spring having a rectangular cross section with a thickness and a width, said thickness being smaller than said width, and said spring being connected to said inner float arm section such that said width is oriented in a substantially vertical direction during use.

30. A gauge according to claim 29, wherein said float arm spring includes ends which are connected to said ends of said arm sections with welds.

31. A gauge according to claim 29, wherein said float arm spring includes ends which are connected to said ends of said float arm sections with pins.

32. A gauge according to claim 28, wherein said float arm hinge section comprises:
a first hinge member and a second hinge member pivotally connected to one another to allow relative movement in a second plane;
said first hinge member being connected to said inner end of said outer float arm section;
said second hinge member being connected to said outer end of said inner float arm section such that said second plane is oriented in a substantially horizontal direction during use; and
an elastic member connected between said float arm sections and providing a biasing force for urging said outer float arm section into said first position.

33. A gauge according to claim 32, wherein said elastic member is a elastomer sleeve defining a bore;
said sleeve being connected to each said arm section;
said hinge members being positioned within said bore.

34. A gauge according to claim 32, wherein said elastic member is a cylindrical helical spring connected to each said arm section;
said hinge members being positioned within the bore of said spring.

35. A liquid level gauge comprising:
(a) a gauge head adapted for mounting to a portion of a liquid storing container;
(b) a float arm structure having an axial member, said axial member defining an axis and being rotatably mounted to said gauge head and depending therefrom;
(c) said float arm structure including a float arm segment extending from said axial member substantially perpendicular to said axis of said axial member, and a counterweight segment extending from said axial member substantially perpendicular to said axis of said axial member and opposite the direction of extension of said float arm segment;
(d) said counterweight segment having an elongate inner arm section, an elongate outer arm section and a hinge section;
said inner arm section being rigidly connected to said axial member for movement through an arc;
said hinge section being connected at a first end to an outer end of said inner arm section and connected at an opposite end to an inner end of said outer arm section;
said hinge section being deflectable to allow movement of said outer arm section between a first configuration in which said outer arm section is in a predetermined position with respect to said inner arm section and a second configuration in which said outer arm section is not in said predetermined position with respect to said inner arm section;
said hinge section providing a biasing force for urging said outer arm section into said first configuration;
(e) said float arm segment having an elongate inner float arm section, an elongate outer float arm section and a float arm hinge section;
said inner float arm section being rigidly connected to said axial member for movement through an arc;
said float arm hinge section being connected at a first end to an outer end of said inner float arm section and connected at an opposite end to an inner end of said outer float arm section;

said float arm hinge section being deflectable to allow movement of said outer float arm section between a first configuration in which said outer float arm section is in a predetermined position with respect to said inner float arm section and a second configuration in which said outer float arm section is not in said predetermined position with respect to said inner float arm section;

said float arm hinge section providing a biasing force for urging said outer float arm section into said first configuration; and (f) a float connected to an outer end of said elongate float arm section, said float being buoyant so as to remain at the surface of said liquid.

\* \* \* \* \*